US012594872B2

(12) United States Patent
Alexander

(10) Patent No.: US 12,594,872 B2
(45) Date of Patent: Apr. 7, 2026

(54) LOCKABLE CARGO RETAINING APPARATUS

(71) Applicant: Roger Don Alexander, Salem, OR (US)

(72) Inventor: Roger Don Alexander, Salem, OR (US)

( * ) Notice: Subject to any disclaimer, the term of this patent is extended or adjusted under 35 U.S.C. 154(b) by 911 days.

(21) Appl. No.: 17/535,513

(22) Filed: Nov. 24, 2021

(65) Prior Publication Data

US 2022/0161710 A1 May 26, 2022

Related U.S. Application Data

(60) Provisional application No. 63/117,751, filed on Nov. 24, 2020.

(51) Int. Cl.
*B60P 7/00* (2006.01)
*B60P 7/15* (2006.01)

(52) U.S. Cl.
CPC ..................................... *B60P 7/15* (2013.01)

(58) Field of Classification Search
CPC ......................................................... B60P 7/15
See application file for complete search history.

(56) References Cited

U.S. PATENT DOCUMENTS

| | | | | |
|---|---|---|---|---|
| 5,451,088 A | * | 9/1995 | Broad | B60R 9/06 |
| | | | | 224/521 |
| 5,700,047 A | | 12/1997 | Leitner et al. | |
| 5,924,753 A | * | 7/1999 | DiBassie | B62D 33/0273 |
| | | | | 296/26.1 |
| 8,087,709 B2 | * | 1/2012 | Jackson, Sr. | B60R 9/06 |
| | | | | 296/26.08 |
| 8,328,263 B1 | * | 12/2012 | Alexander | B62D 33/0273 |
| | | | | 410/97 |
| 8,439,612 B2 | * | 5/2013 | Chamoun | B60P 3/077 |
| | | | | 410/94 |
| 10,577,031 B2 | * | 3/2020 | Crawford | B62D 33/02 |
| 2016/0243976 A1 | * | 8/2016 | Cote | B60P 7/15 |

OTHER PUBLICATIONS

Quadratec, How to Load Plywood in a Jeep Gladiator Truck, May 9, 2019, youtube.com.
Bronkbuilt, Live Action of Loading, Hauling, and Unloading of sheet goods—4×8 plywood in a short bed truck, Apr. 8, 2019, youtube.com.
Austin Kayak, How to Install the Darby Extend-A-Truck Bed Extender, Aug. 7, 2013, youtube.com.
Doctor Vs. Dirt, Review of Harbor Freight Truck Bed Extender / How to Load Long Lumber in a Short Truck Bed, Mar. 23, 2020, youtube.com.

* cited by examiner

*Primary Examiner* — Steven O Douglas

(57) ABSTRACT

A lockable cargo retaining apparatus is a user-configurable modification to existing cargo vehicles, specifically pickup trucks with folding tailgates. The lockable cargo retaining apparatus utilizes a carrier rail and carriage to create an adjustable backstop for any cargo in the bed of any truck, preventing the load from slipping or shifting during transport. A locking mechanism is engaged between the carrier rail and the carriage to fix the carriage in position, with the carriage further supporting at least one load-securing element to directly secure any cargo within the bed of the truck. At least one load-securing mechanism is also interchangeable with multiple proposed embodiments to enable the effective retention of various types of cargo.

19 Claims, 10 Drawing Sheets

LOCKABLE CARGO RETAINING APPARATUS

FIELD OF THE INVENTION

The present invention generally relates to an apparatus for increasing load security and overall cargo capacity of a pick-up truck or similar vehicle.

BACKGROUND OF THE INVENTION

Independent contractors, small business owners, and avid "Do-It-Yourself" (DIY) practitioners often find themselves transporting a variety of building and construction hardware and material. Thus, most of the aforementioned people drive or own a pick-up truck or a similar vehicle. Pick-up trucks are convenient, but at times result limiting and sometimes require additional components such as straps or any similar means in order to secure the building material. Typically, incorporating additional components for safety and handling takes time to setup and remove.

Therefore, there is a need for a quick and easy-to-use tool which allows for transportation and handling of building and construction materials. The present invention aims to provide the user with additional space, maximizing the use of their truck bed, and safely securing the building and construction materials in a relatively fast and easy way. The following document aims to provide an accurate and detailed description of the present invention without limiting the scope of the invention, and the accompanying figures are intended to help illustrate the present invention. Thus, the accompanying figures do not limit the scope of the invention in any way, shape or form.

Additional advantages of the invention will be set forth in part in the description which follows, and in part will be obvious from the description, or may be learned by practice of the invention. Additional advantages of the invention may be realized and attained by means of the instrumentalities and combinations particularly pointed out in the detailed description of the invention section. Further benefits and advantages of the embodiments of the invention will become apparent from consideration of the following detailed description given with reference to the accompanying drawings, which specify and show preferred embodiments of the present invention.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

In reference to FIG. 1 through 10, the present invention is a lockable cargo retaining apparatus configured to expand the effective cargo space of utility vehicles in general, and compact pickup trucks specifically. The present invention is preferably engaged into a crevice between the truck bed and tailgate as shown in exemplary form in FIG. 2, wherein the surface of the deployed tailgate is effectively converted into useable cargo space. Any pickup truck modified thusly provides a toolless, user-adjustable means of securing oversized loads into an otherwise undersized cargo bed area, e.g., securing 8-foot strands of lumber in a 4-foot truck bed.

Figure 1:
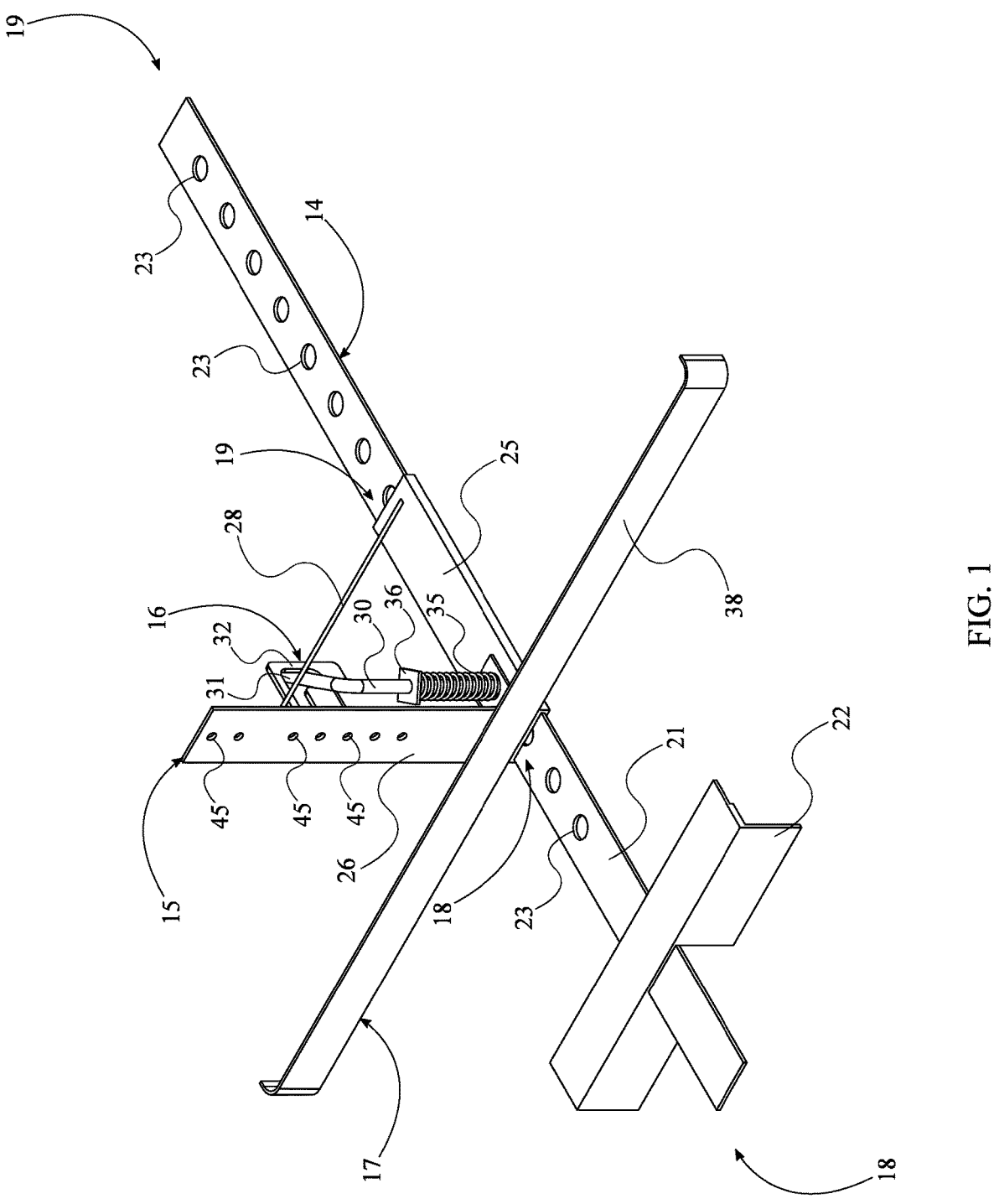
FIG. 1 is a top-front-left perspective view of a first embodiment of the present invention.

The lockable cargo retaining apparatus comprises a carrier rail 14, a carriage 15, a locking mechanism 16, and at least one load-securing element 17 in the first embodiment shown in FIG. 1. The carrier rail 14 and the carriage 15 each extend between a fore end 18 and a rear end 19 to provide sufficient dimensions for the carriage 15 to be repositioned and adjusted along the carrier rail 14, according to the needs of any individual user or operator. More specifically, the carriage 15 is slidably mounted onto the carrier rail 14 between the fore end 18 and the rear end 19 of the carrier rail 14 to enable the operator to expand or reduce the effective cargo area supported by the present invention without fully separating the carriage 15 from the carrier rail 14 as shown in FIG. 3.

Figure 2:
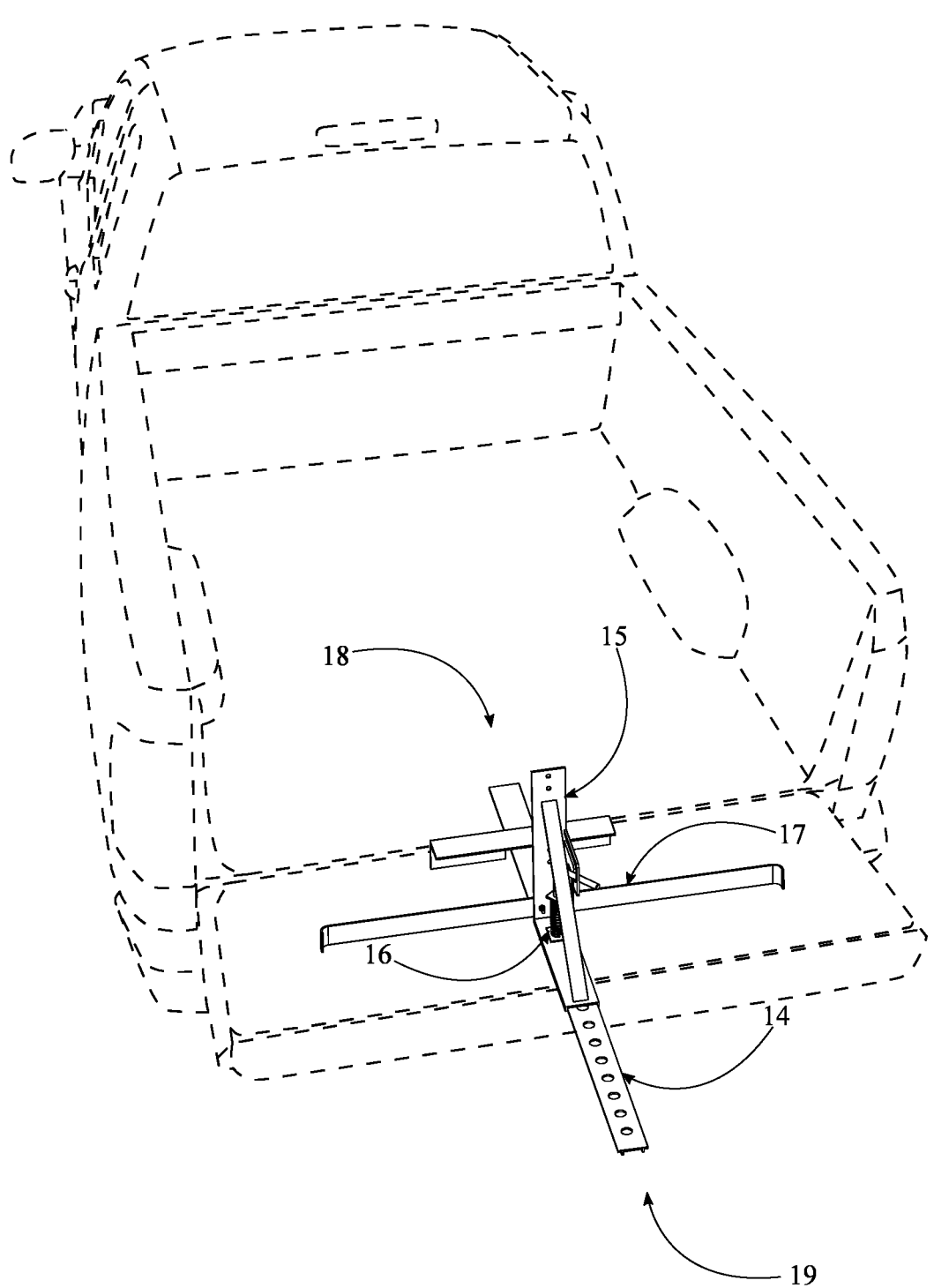
FIG. 2 is top-rear perspective view thereof, wherein an exemplary vehicle is equipped with the first embodiment of the present invention.

Further, the at least one load-securing element 17 is mounted onto the carriage 15 to establish a supported limitation to the cargo area as shown in FIG. 2. The at least one load securing element constitutes an elongate bar or plate spanning substantially across the exposed area of the truck bed in the exemplary first embodiment, but it is further proposed that the at least one load-securing element 17 broadly defines any type or variety of functionally similar structure suitable for securing various cargo types as exemplified in FIGS. 7 and 10.

Figure 3:
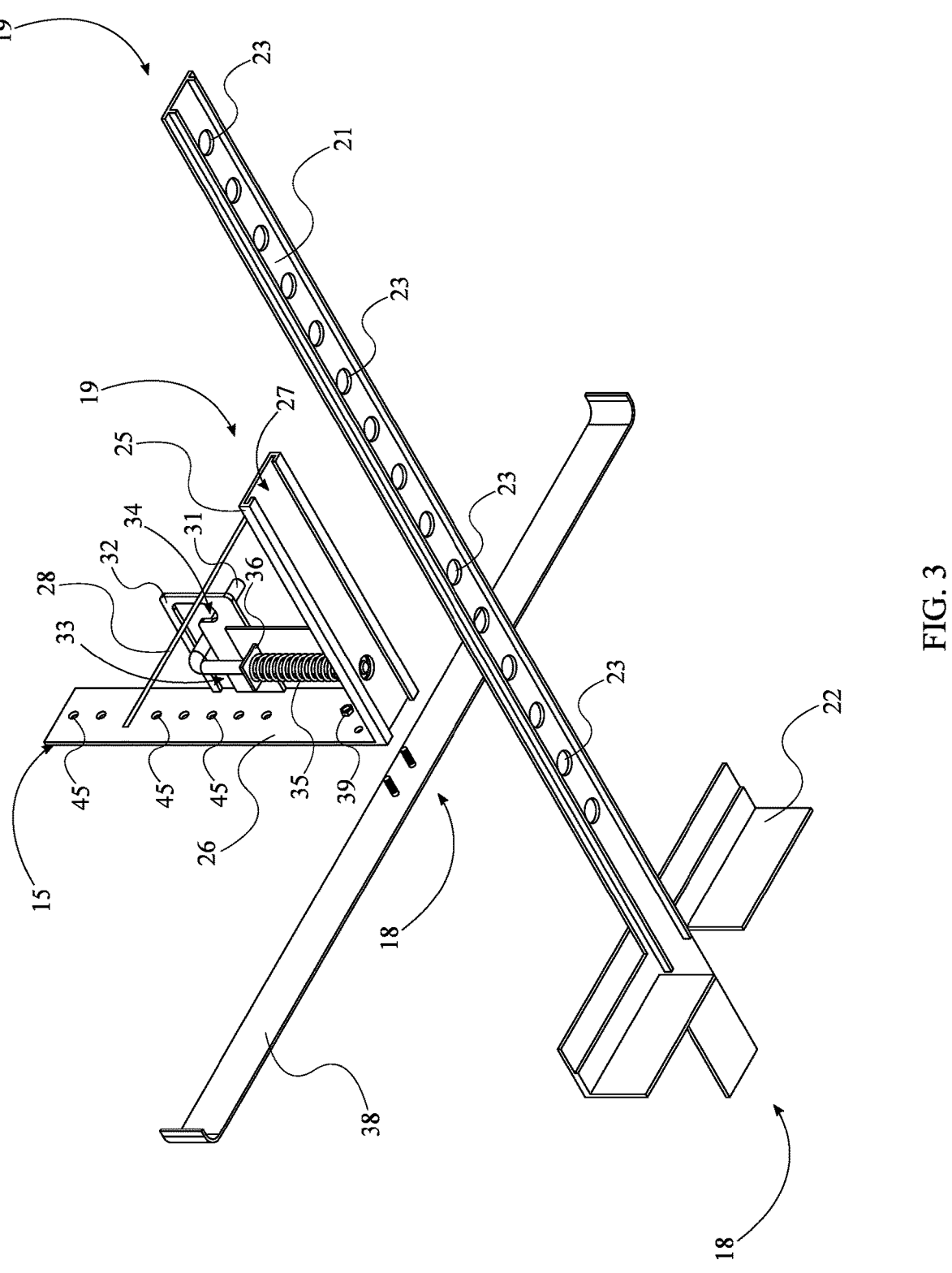
FIG. 3 is a bottom-rear-left exploded view thereof, wherein a locking mechanism is depicted in an unlocked configuration.
Figure 4:
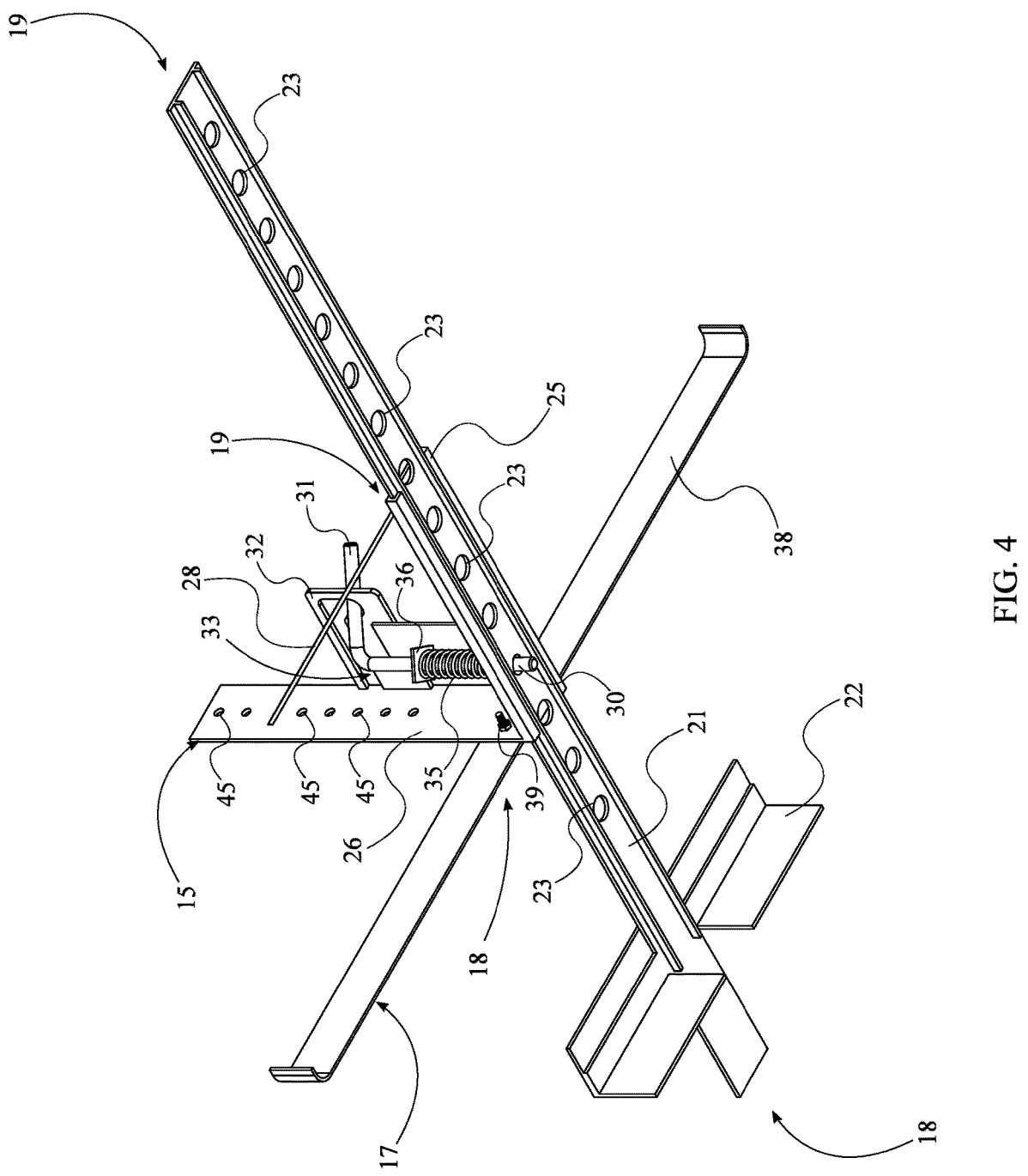
FIG. 4 is an alternate view thereof, wherein the locking mechanism is depicted in a closed configuration.

In reference to FIGS. 3 and 4, the locking mechanism 16 is releasably engaged between the carriage 15 and the carrier rail 14. The carriage 15 is selectably attached along the carrier rail 14 between the fore end 18 and the rear end 19 of the carrier rail 14 through the locking mechanism 16. Adjustment of the carriage 15 towards the rear end 19 of the carrier rail 14 effectively increases the effective cargo area of a subject vehicle, while adjusting the carriage 15 towards the fore end 18 constricts the cargo area to more tightly retain any cargo therein. The locking mechanism 16, in general, refers to any releasable fixture that may be suitable to index and fix the carriage 15 into position to resist any load-shifting or strain exerted by the cargo against the at least one load-securing element 17 as the vehicle is in motion.

As indicated in FIGS. 1, 3, and 4 the carrier rail 14 further comprises a main bar 21, a claw mount 22, and a plurality of locking formations 23. The main bar 21 extends between the fore end 18 and the rear end 19 or the carrier rail 14 to provide a rigid substructure upon which the carriage 15 may be mounted. The main bar 21 constitutes an elongate metallic structure of irregular profile, suitable for retaining any compatible formations of the carriage 15 across all embodiments thereof. The claw mount 22 extends perpendicular from the main bar 21 proximal to the fore end 18 of the carrier rail 14, specifically positioned to engage into the gap or crevice formed between the truck bed and the tailgate when said tailgate is in the open or lowered position as shown in FIG. 2. The claw mount 22 is specifically positioned proximal to, but not adjacent to the fore end 18 of the carrier rail 14 to enable the main bar 21 to span this gap once affixed to the subject vehicle. This configuration is preferred as the cargo load borne by the main bar 21 is spread more evenly across the tailgate and truck bed.

As shown in FIGS. 3 and 4, the plurality of locking formations 23 is distributed along the main bar 21 between the fore end 18 and the rear end 19 of the carrier rail 14. The plurality of perforations 45 generally refers to any pattern or surface feature that is engageable by the locking mechanism 16, or otherwise applies a braking affect to the carriage 15 in combination with the locking mechanism 16. The locking mechanism 16 is selectably engaged with one of the plurality of locking formations 23, wherein the operator or user operates the locking mechanism 16 to engage or release a fixation to the plurality of locking formations 23. The plurality of locking formations 23 ideally provides a uniform, universal means of affixing the carriage 15 to various positions along the carrier rail 14 via the locking mechanism 16, including interchangeable embodiments of both the locking mechanism 16 and the carriage 15 as may be suitable for any given cargo load.

In further reference to FIGS. 3 and 4, the carriage 15 further comprises a horizontal panel 25, a vertical panel 26, a bearing channel 27, and at least one support strut 28. The bearing channel 27 traverses the horizontal panel 25 between the fore end 18 and the rear end 19 of the carriage 15, corresponding in dimensions to the profile of the carrier rail 14 to ensure slidable fitment thereto. Accordingly, the carrier rail 14 is slidably positioned into the bearing channel 27 with sufficient material tolerance to enable an operator to manually traverse the carriage 15 along the carrier rail 14 between different operable positions.

Figure 6:
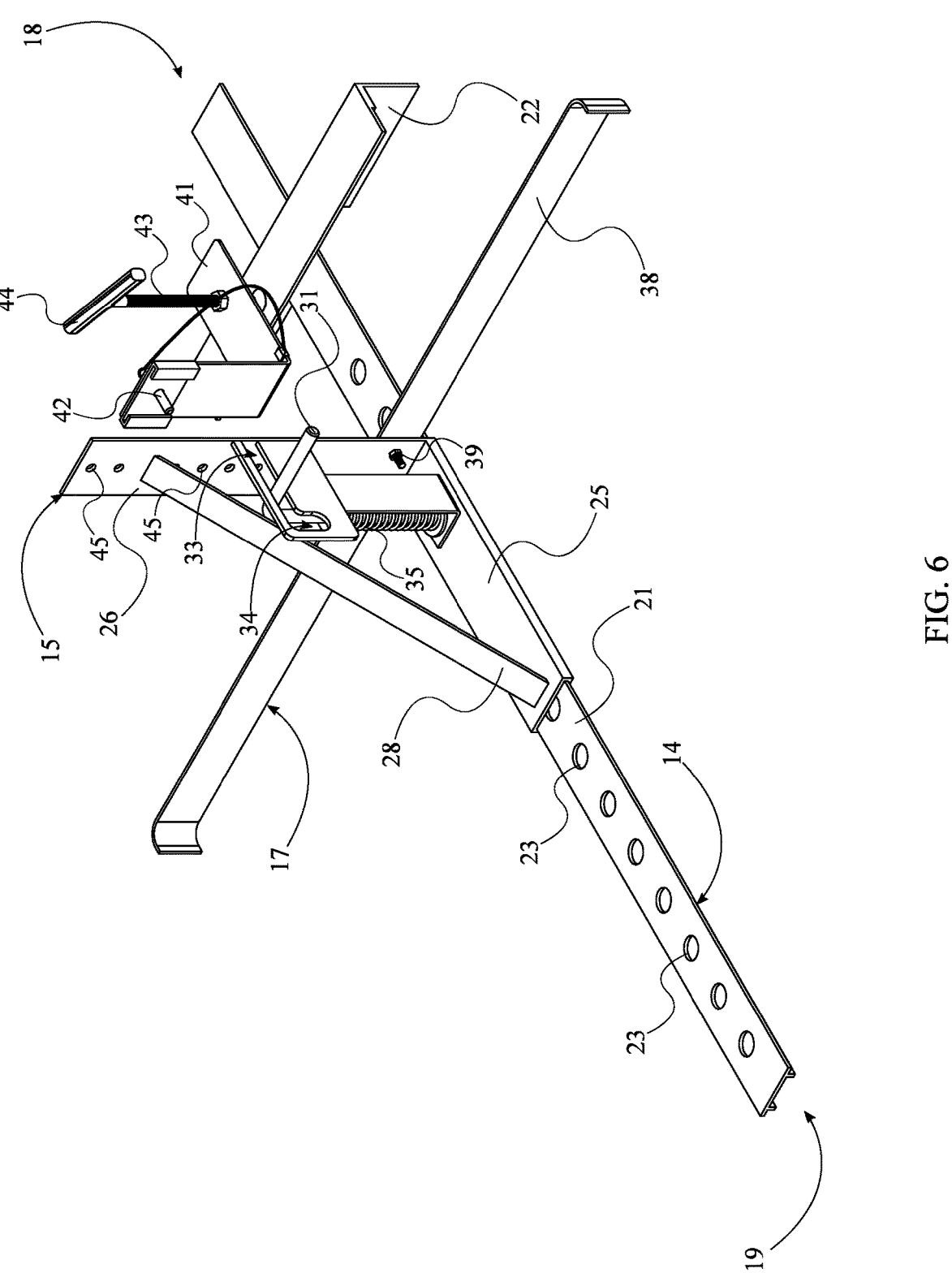
FIG. 6 is a top-rear-right exploded view thereof.

As indicated in FIGS. 1 and 6, the vertical panel 26 is mounted to the horizontal panel 25 adjacent to the fore end 18 of the carriage 15 and the at least one support strut 28 is connected between the horizontal panel 25 and the vertical panel 26. The triangulation of the carriage 15 provides optimum support to the at least one load-securing device mounted thereto, preventing any deformation or deflection of the carriage 15 under strain. The vertical panel 26 is further proposed to allow configurations of the at least one load-securing device at selectable offsets from the carrier rail 14, thereby enabling an operator to adjust to handle larger cargo loads.

Referring again to FIGS. 1, 3, and 4 the locking mechanism 16 further comprises a locking pin 30, an operating handle 31, a lock plate 32, a cam guide 33, a lock groove 34, a spring member 35, and a spring perch 36. The lock plate 32 is mounted to the vertical panel 26 of the carriage 15 with the cam guide 33 extending along the lock plate 32, the orientation of the lock plate 32 relative to the horizontal panel 25 being variable across multiple embodiments. The lock groove 34 is terminally conjoined to the cam guide 33 to define an irregular dip or rise in the normal path of the cam guide 33. This lock groove 34 provides the means for the locking pin 30 to be adjusted into a locked configuration as the operating handle 31 enters the lock groove 34 from the cam guide 33 as shown in FIG. 4. In reverse, adjusting the operating handle 31 out of the lock groove 34 and into the cam guide 33 constitutes an unlocked configuration as shown in FIG. 3.

Accordingly, the operating handle 31 is terminally and angularly mounted to the locking pin 30 and the operating handle 31 is positioned into the cam guide 33. From the operating handle 31, the locking pin 30 extends through the carriage 15 and is selectably engaged along the carrier rail 14. This arrangement enables the operator to manually adjust the position of the locking pin 30 by interacting with the portion of the operating handle 31 that is exposed through the lock plate 32, i.e., manually lock or unlock the locking mechanism 16. As the locking pin 30 is moved to the unlocked configuration, the carriage 15 is preferably freed to traverse the carrier rail 14 until the locking pin 30 is reengaged with the carrier rail 14. In one embodiment, the unlocked configuration may permit the full removal of the carriage 15 from the carrier rail 14 as illustrated in the exploded view of FIG. 3.

Further, the spring perch 36 is mounted onto the locking pin 30 between the carriage 15 and the operating handle 31, wherein the spring member 35 biases the operating handle 31 into the lock groove 34 as shown in FIGS. 3 and 4. The spring member 35 is connected between the spring perch 36 and the carriage 15 to provide a constant directional bias or vector to the locking pin 30, whereby the locking pin 30 is forced into engagement with the carrier rail 14 as the operating handle 31 is positioned in the lock groove 34. As outlined, an operator acts against the spring member 35 via the operating handle 31 to unlock the locking mechanism 16 by positioning the operating handle 31 in the cam guide 33 of the lock plate 32.

In the first embodiment shown in FIG. 1 through 4, the at least one load-securing element 17 comprises a retaining plate 38 and at least one fastener 39. The retaining plate 38 is positioned adjacent to the fore end 18 of the carriage 15 and the retaining plate 38 is oriented laterally to the carrier rail 14. This position is generally directly faced toward the cargo area within the truck bed and is therefore the optimal position for mounting any embodiment of the retaining plate 38 to physically delineate and support said cargo area. Further, the retaining plate 38 is proposed to be removeable to permit ease of transport when not in-use and to permit the attachment of alternate embodiments of the retainer bar suited to each individual use-case. Accordingly, the retaining plate 38 is releasably mounted to the carriage 15 with the at least one fastener 39 as shown in FIG. 3. The at least one fastener 39 broadly refers to any type of releasable or adjustable fastener as may be realized by any reasonably skilled individual.

Figure 5:
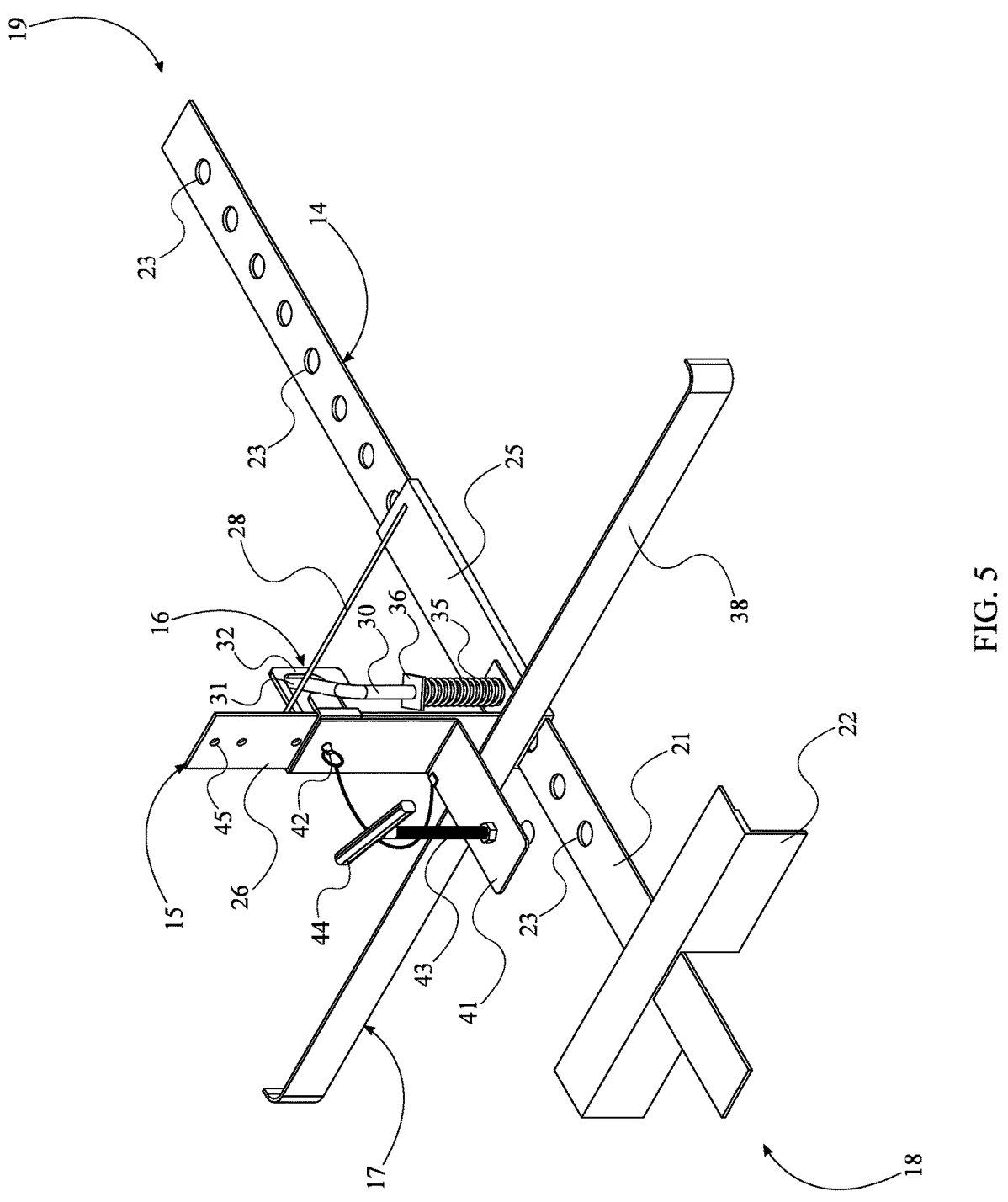
FIG. 5 is a top-front-left perspective view of a second embodiment of the present invention.
Figure 7:
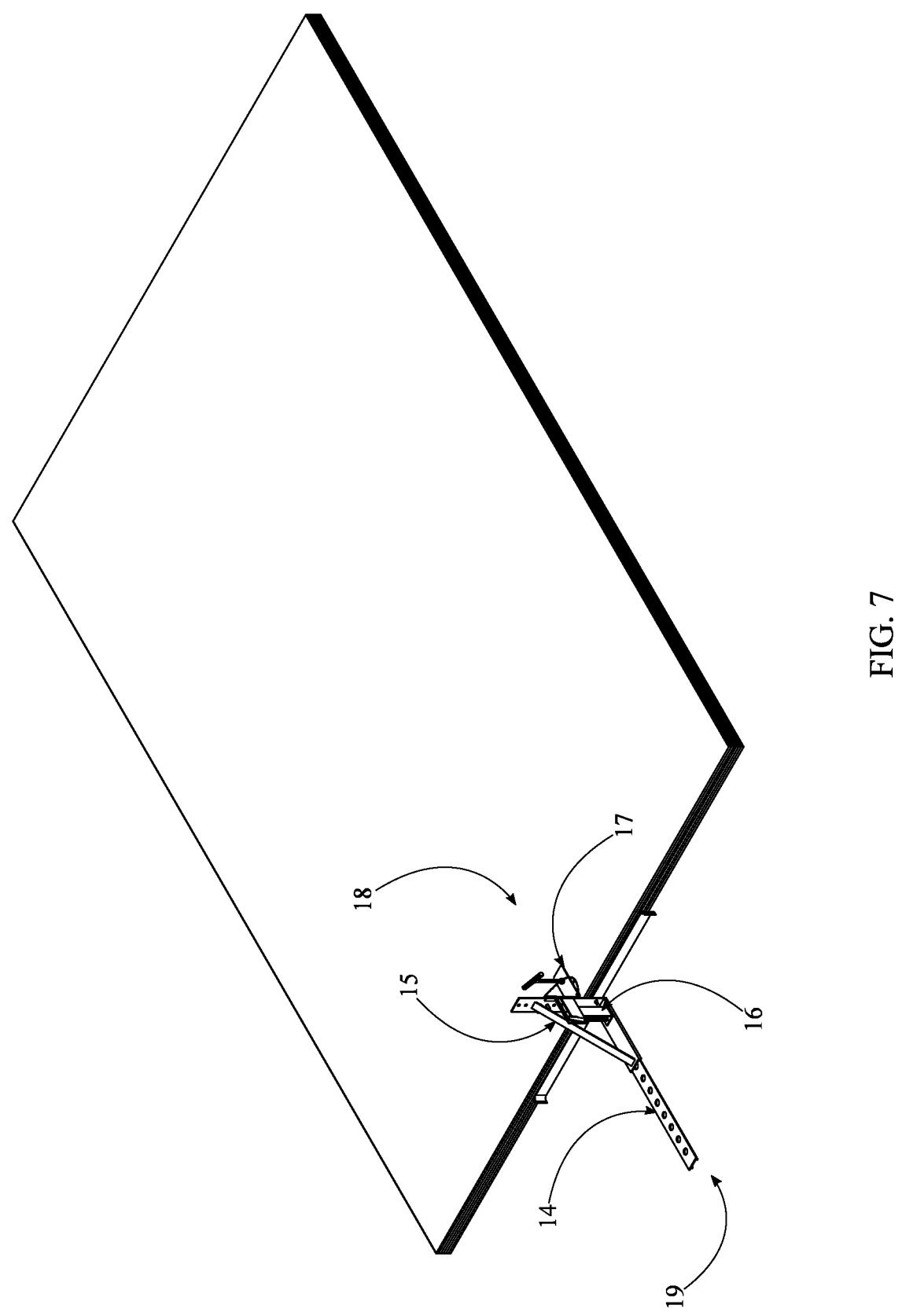
FIG. 7 is an alternate view thereof, wherein the second embodiment is shown retaining an exemplary load of construction materials, e.g., drywall or plywood.

In a second embodiment of the present invention illustrated in FIG. 5 through 7, the at least one load-securing element 17 comprises a cargo bracket 41, a retainer pin 42, a threaded rod 43, and a screw handle 44. This embodiment of the at least one load-securing element 17 is ideally configured for use transporting large sheets of material that are best secured by clamping said material vertically as shown in FIG. 7. More specifically, the cargo bracket 41 is slidably mounted onto a vertical panel 26 of the carriage 15 in a similar adjustable arrangement to the carriage 15 and the carrier rail 14. The vertical panel 26 also comprises a plurality of perforations 45 distributed along the vertical panel 26 with the retainer pin 42 being selectably engaged between the cargo bracket 41 and one of the plurality of perforations 45. The engagement of the retainer pin 42 between the cargo bracket 41 and one of the plurality of perforations 45 further replicates the arrangement of the carriage 15 and the locking mechanism 16, i.e., the cargo bracket 41 is releasably fixed along the vertical panel 26 by the retainer pin 42.

The second embodiment further provides a means of rigidly clamping any materials positioned between the cargo bracket 41 and the carrier rail 14 to prevent load-shifting during transport. As shown in FIG. 5 the threaded rod 43 is adjustably mounted into the cargo bracket 41 towards the carrier rail 14. As the threaded rod 43 is adjusted into position atop any loose materials the threaded rod 43 will impinge and bind against the cargo bracket 41, thereby fixing the cargo between the carrier rail 14 and the threaded rod 43. Further, the screw handle 44 is terminally mounted to the threaded rod 43, opposite the carrier rail 14 along the threaded rod 43. This arrangement provides leverage to the operator to forcibly adjust the threaded rod 43 onto the materials within the cargo area, enabling the threaded rod 43 to be engaged and released without the use of any external tools.

Figure 8:
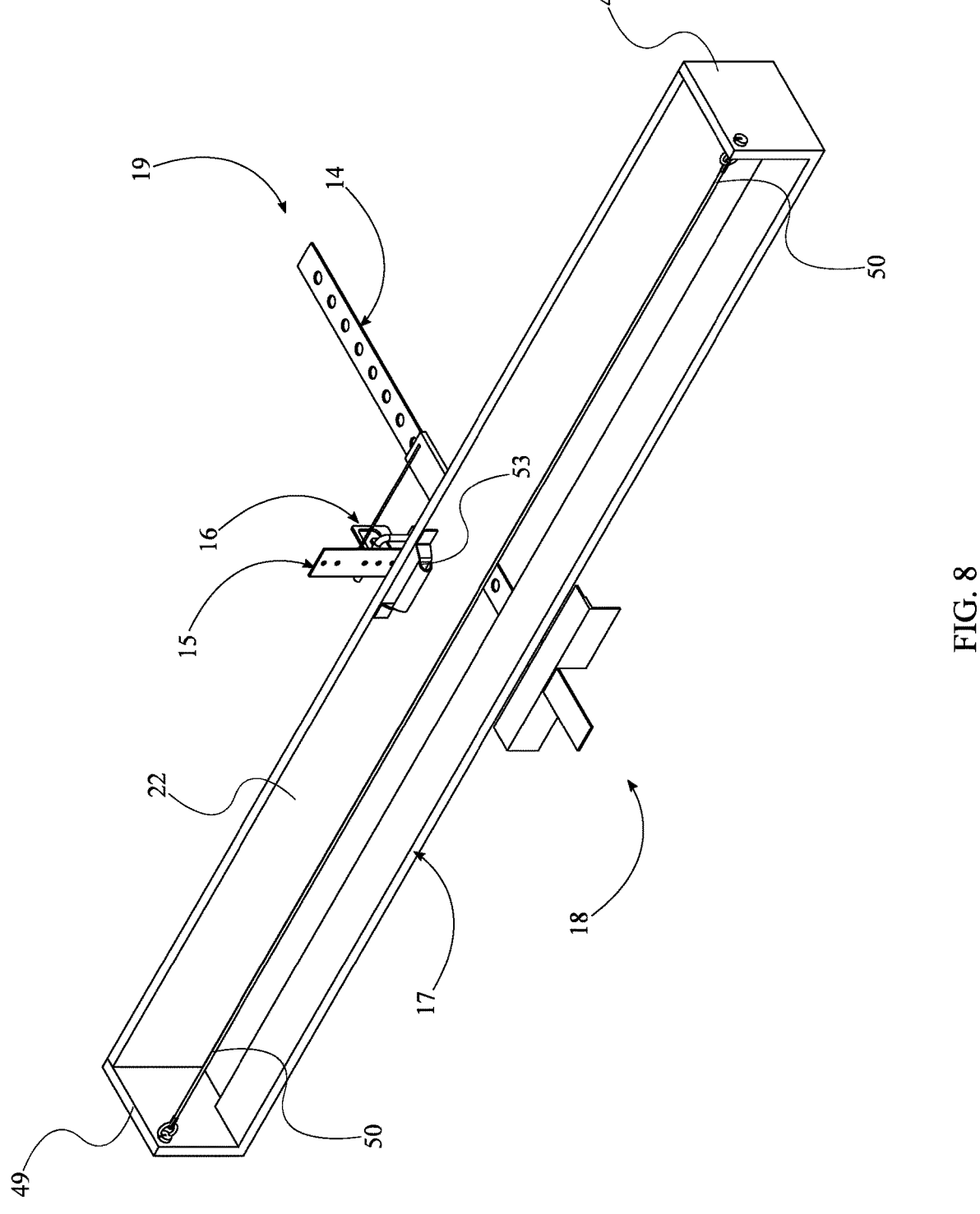
FIG. 8 is a top-front-left perspective view of a third embodiment of the present invention.
Figure 9:
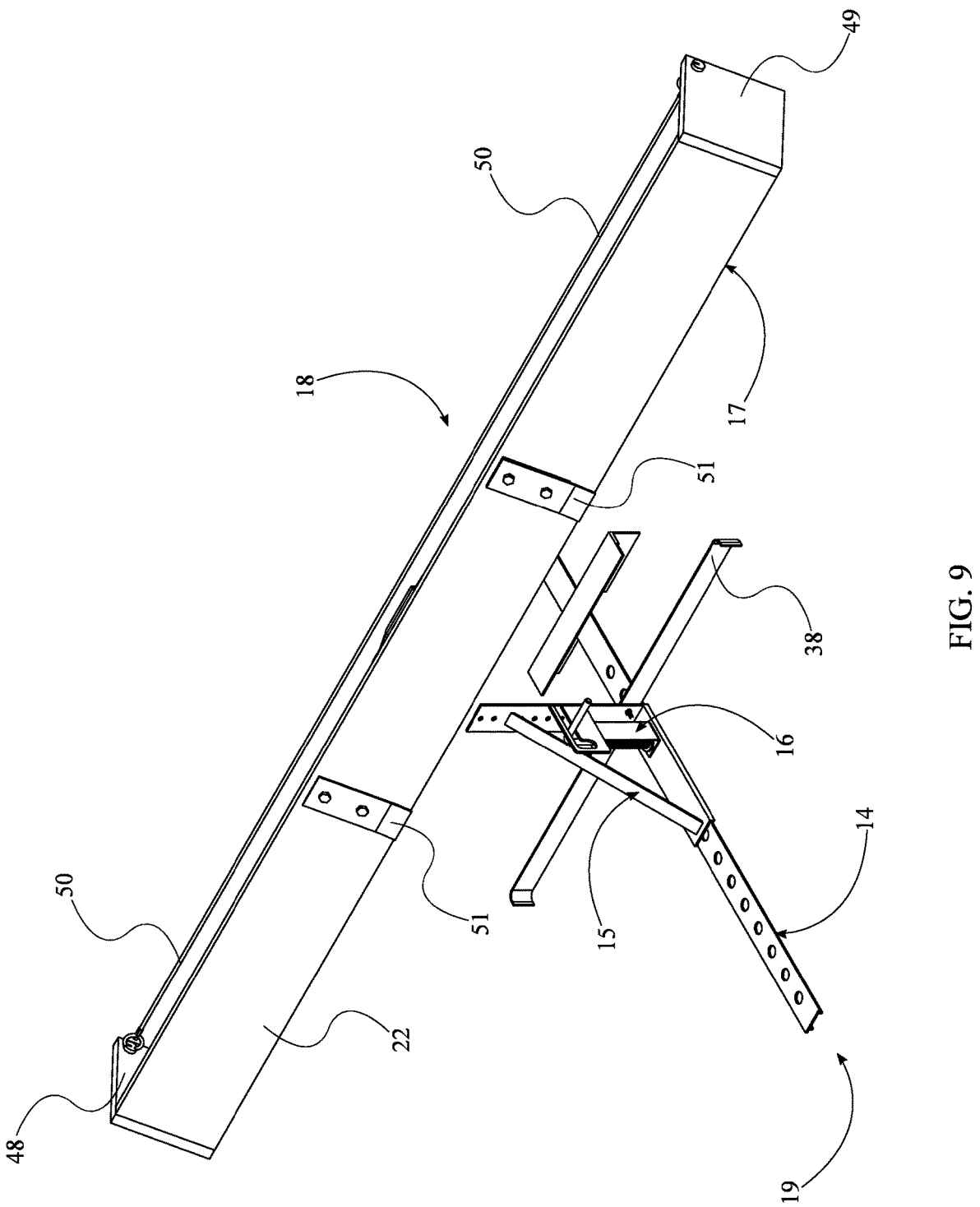
FIG. 9 is a top-rear-right exploded view thereof.
Figure 10:
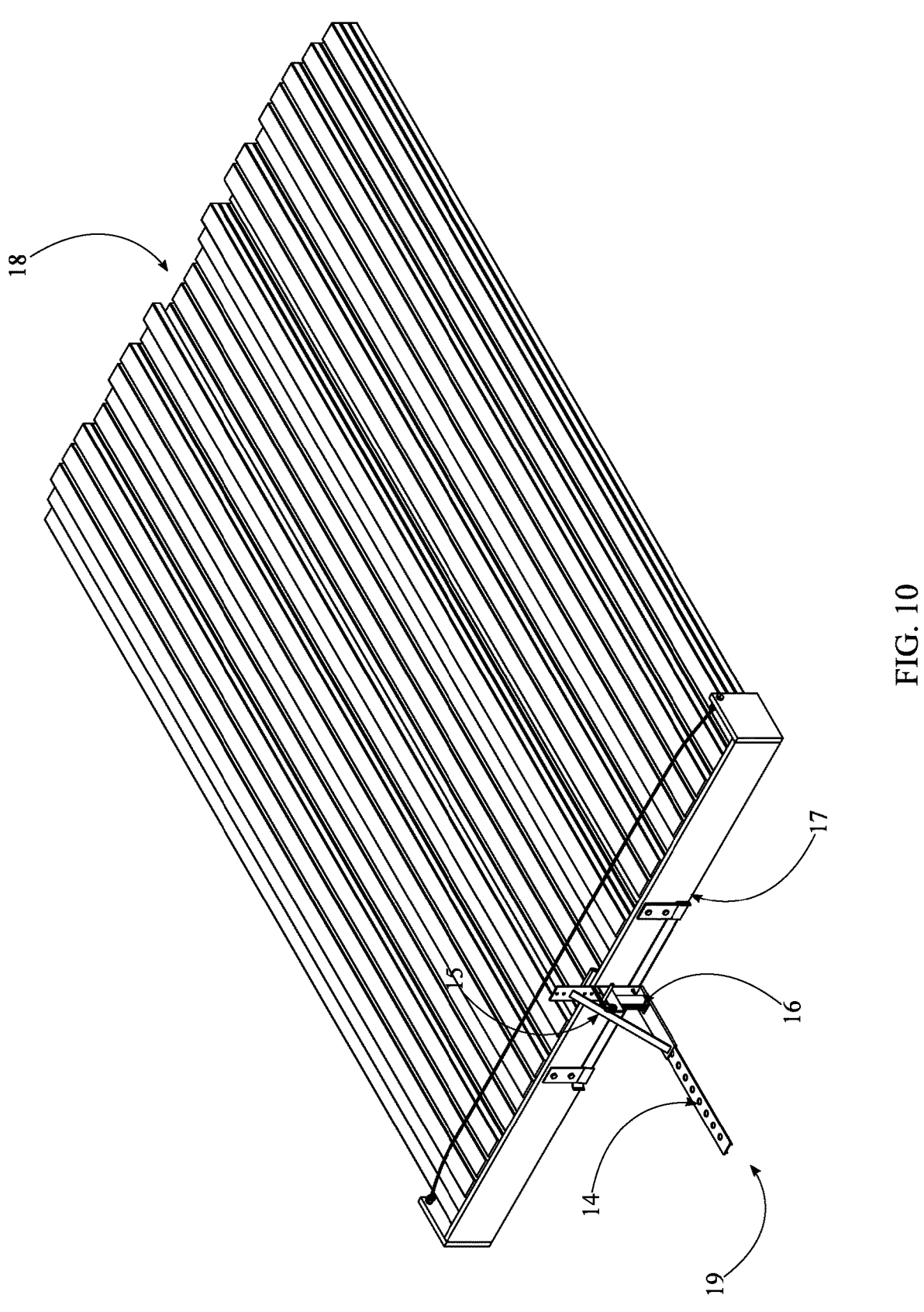
FIG. 10 is an alternate view thereof, wherein the third embodiment is shown retaining an exemplary load of construction materials, e.g., planks or lumber.

In a third embodiment of the present invention, the at least one load-securing element 17 comprises a retaining wall 47, a first lateral panel 48, a second lateral panel 49, at least one tensile member 50, and at least one fixture tab 51 as illustrated in FIGS. 8 through 10. The retaining wall 47 is oriented laterally and removably attached to the carriage 15, generally spanning across the tailgate of a subject vehicle to enclose any loose cargo therein. The first lateral panel 48 and the second lateral panel 49 are terminally connected to the retaining wall 47 opposite each other along the retaining wall 47 to complete said enclosure of the cargo area, thereby preventing loosely stacked articles from spilling out from the cargo area. Further, the at least one tensile member 50 is mounted between the first lateral panel 48 and the second lateral panel 49 as shown in FIG. 8. The at least one tensile member 50 provides a flexible, adjustable means of retaining an irregular stack of cargo between the first lateral panel 48 and the second lateral panel 49. This third embodiment is specifically proposed for use as a means of retaining a large quantity of loose elongate items, e.g., pipes, tubing, lumber, and siding.

Further, the third embodiment is proposed as an attachable modification and expansion of the first embodiment as indicated in FIG. 9. Accordingly, the at least one fixture tab 51 is mounted to the retaining wall 47, opposite the at least one tensile member 50. The at least one fixture tab 51 generally refers to any clips, clasps, slots, or other mounting structures of suitable profile and dimensions to secure the retaining wall 47 to the retaining plate 38. More specifically, the at least one fixture tab 51 is releasably engaged to the retaining plate 38, wherein the retaining plate 38 is configured as an intermediary mount for the retailing wall, the first lateral panel 48, the second lateral panel 49, and the at least one tensile member 50.

It is further proposed that the at least one load-securing element 17 comprises the retaining wall 47, the first lateral panel 48, the second lateral panel 49, and a lifting handle 53 as indicated in FIG. 8. The lifting handle 53 is mounted to the retaining wall 47 between the first lateral panel 48 and the second lateral panel 49 to provide operators with a convenient handhold to displace and reposition the at least one load-securing element 17. It is further considered that the lifting handle 53 may secondarily be used to transport entirety of the present invention, or portions thereof, in a collapsed or disassembled configuration by storing the carriage 15, the carrier rail 14, and the locking mechanism 16 between the first lateral panel 48 and the second lateral panel 49 for convenience.

Although the invention has been explained in relation to its preferred embodiment, it is to be understood that many other possible modifications and variations can be made without departing from the spirit and scope of the invention as hereinafter claimed.

What is claimed is:

1. A lockable cargo retaining apparatus comprising:
a carrier rail;
a carriage;
a locking mechanism;
at least one load-securing element;
the carrier rail and the carriage each extending between a fore end and a rear end;
the carriage being slidably mounted onto the carrier rail between the fore end and the rear end of the carrier rail;
the at least one load-securing element being mounted onto the carriage;
the locking mechanism being releasably engaged between the carriage and the carrier rail, wherein the carriage is selectably attached along the carrier rail between the fore end and the rear end of the carrier rail through the locking mechanism
the at least one load-securing element comprising a retaining plate and at least one fastener;
the retaining plate being positioned adjacent to the fore end of the carriage;
the retaining plate being oriented laterally to the carrier rail; and
the retaining plate being releasably mounted to the carriage with the at least one fastener.

2. The lockable cargo retaining apparatus as claimed in claim 1 comprising:
the carrier rail further comprising a main bar, a claw mount, and a plurality of locking formations,
the main bar extending between the fore end and the rear end or the carrier rail;
the claw mount extending perpendicular from the main bar proximal to the fore end of the carrier rail;
the plurality of locking formations being distributed along the main bar between the fore end and the rear end of the carrier rail; and
the locking mechanism being selectably engaged with one of the plurality of locking formations.

3. The lockable cargo retaining apparatus as claimed in claim 1 comprising:
the carriage further comprising a horizontal panel, a vertical panel, a bearing channel, and at least one support strut;
the bearing channel traversing the horizontal panel between the fore end and the rear end of the carriage;
the carrier rail being slidably positioned into the bearing channel;
the vertical panel being mounted to the horizontal panel adjacent to the fore end of the carriage; and
the at least one support strut being connected between the horizontal panel and the vertical panel.

4. The lockable cargo retaining apparatus as claimed in claim 1 comprising:

the locking mechanism further comprising a locking pin, an operating handle, a lock plate, a cam guide, a lock groove, a spring member, and a spring perch;

the lock plate being mounted to a vertical panel of the carriage;

the cam guide extending along the lock plate;

the lock groove being terminally conjoined to the cam guide;

the operating handle being terminally and angularly mounted to the locking pin;

the operating handle being positioned into the cam guide;

the spring perch being mounted onto the locking pin between the carriage and the operating handle, wherein the spring member biases the operating handle into the lock groove;

the spring member being connected between the spring perch and the carriage; and the locking pin extending through the carriage and being selectably engaged along the carrier rail.

5. The lockable cargo retaining apparatus as claimed in claim 1 comprising:

the at least one load-securing element comprising a cargo bracket, a retainer pin, a threaded rod, and a screw handle;

the cargo bracket being slidably mounted onto a vertical panel of the carriage;

the vertical panel comprising a plurality of perforations distributed along the vertical panel;

the retainer pin being selectably engaged between the cargo bracket and one of the plurality of perforations;

the threaded rod being adjustably mounted into the cargo bracket towards the carrier rail; and the screw handle being terminally mounted to the threaded rod, opposite the carrier rail along the threaded rod.

6. The lockable cargo retaining apparatus as claimed in claim 1 comprising:

the at least one load-securing element comprising a retaining wall, a first lateral panel, a second lateral panel, at least one tensile member, and at least one fixture tab;

the retaining wall being oriented laterally and removably attached to the carriage;

the first lateral panel and the second lateral panel being terminally connected to the retaining wall opposite each other along the retaining wall;

the at least one tensile member being mounted between the first lateral panel and the second lateral panel;

the at least one fixture tab being mounted to the retaining wall, opposite the at least one tensile member; and the at least one fixture tab being releasably engaged to a retaining plate.

7. The lockable cargo retaining apparatus as claimed in claim 1 comprising:

the at least one load-securing element comprising a retaining wall, a first lateral panel, a second lateral panel, and a lifting handle; and the lifting handle being mounted to the retaining wall between the first lateral panel and the second lateral panel.

8. A lockable cargo retaining apparatus comprising:

a carrier rail;

a carriage;

a locking mechanism;

at least one load-securing element;

the carrier rail and the carriage each extending between a fore end and a rear end;

the carriage being slidably mounted onto the carrier rail between the fore end and the rear end of the carrier rail;

the at least one load-securing element being mounted onto the carriage;

the locking mechanism being releasably engaged between the carriage and the carrier rail, wherein the carriage is selectably attached along the carrier rail between the fore end and the rear end of the carrier rail through the locking mechanism;

the carrier rail further comprising a main bar, a claw mount, and a plurality of locking formations;

the main bar extending between the fore end and the rear end or the carrier rail;

the claw mount extending perpendicular from the main bar proximal to the fore end of the carrier rail;

the plurality of locking formations being distributed along the main bar between the fore end and the rear end of the carrier rail; and the locking mechanism being selectably engaged with one of the plurality of locking formations.

9. The lockable cargo retaining apparatus as claimed in claim 8 comprising:

the carriage further comprising a horizontal panel, a vertical panel, a bearing channel, and at least one support strut;

the bearing channel traversing the horizontal panel between the fore end and the rear end of the carriage;

the carrier rail being slidably positioned into the bearing channel;

the vertical panel being mounted to the horizontal panel adjacent to the fore end of the carriage; and the at least one support strut being connected between the horizontal panel and the vertical panel.

10. The lockable cargo retaining apparatus as claimed in claim 8 comprising:

the locking mechanism further comprising a locking pin, an operating handle, a lock plate, a cam guide, a lock groove, a spring member, and a spring perch;

the lock plate being mounted to a vertical panel of the carriage;

the cam guide extending along the lock plate;

the lock groove being terminally conjoined to the cam guide;

the operating handle being terminally and angularly mounted to the locking pin;

the operating handle being positioned into the cam guide;

the spring perch being mounted onto the locking pin between the carriage and the operating handle, wherein the spring member biases the operating handle into the lock groove;

the spring member being connected between the spring perch and the carriage; and the locking pin extending through the carriage and being selectably engaged along the carrier rail.

11. The lockable cargo retaining apparatus as claimed in claim 8 comprising:

the at least one load-securing element comprising a retaining plate and at least one fastener;

the retaining plate being positioned adjacent to the fore end of the carriage;

the retaining plate being oriented laterally to the carrier rail; and the retaining plate being releasably mounted to the carriage with the at least one fastener.

12. The lockable cargo retaining apparatus as claimed in claim 8 comprising:

the at least one load-securing element comprising a cargo bracket, a retainer pin, a threaded rod, and a screw handle;

the cargo bracket being slidably mounted onto a vertical panel of the carriage;

the vertical panel comprising a plurality of perforations distributed along the vertical panel;

the retainer pin being selectably engaged between the cargo bracket and one of the plurality of perforations;

the threaded rod being adjustably mounted into the cargo bracket towards the carrier rail; and the screw handle being terminally mounted to the threaded rod, opposite the carrier rail along the threaded rod.

13. The lockable cargo retaining apparatus as claimed in claim 8 comprising:

the at least one load-securing element comprising a retaining wall, a first lateral panel, a second lateral panel, at least one tensile member, and at least one fixture tab;

the retaining wall being oriented laterally and removably attached to the carriage;

the first lateral panel and the second lateral panel being terminally connected to the retaining wall opposite each other along the retaining wall;

the at least one tensile member being mounted between the first lateral panel and the second lateral panel;

the at least one fixture tab being mounted to the retaining wall, opposite the at least one tensile member; and the at least one fixture tab being releasably engaged to a retaining plate.

14. The lockable cargo retaining apparatus as claimed in claim 8 comprising:

the at least one load-securing element comprising a retaining wall, a first lateral panel, a second lateral panel, and a lifting handle; and the lifting handle being mounted to the retaining wall between the first lateral panel and the second lateral panel.

15. A lockable cargo retaining apparatus comprising:

a carrier rail;

a carriage;

a locking mechanism;

at least one load-securing element;

the carrier rail and the carriage each extending between a fore end and a rear end;

the carriage being slidably mounted onto the carrier rail between the fore end and the rear end of the carrier rail;

the at least one load-securing element being mounted onto the carriage;

the locking mechanism being releasably engaged between the carriage and the carrier rail, wherein the carriage is selectably attached along the carrier rail between the fore end and the rear end of the carrier rail through the locking mechanism;

the carrier rail further comprising a main bar, a claw mount, and a plurality of locking formations;

the main bar extending between the fore end and the rear end or the carrier rail;

the claw mount extending perpendicular from the main bar proximal to the fore end of the carrier rail;

the plurality of locking formations being distributed along the main bar between the fore end and the rear end of the carrier rail;

the locking mechanism being selectably engaged with one of the plurality of locking formations;

the carriage further comprising a horizontal panel, a vertical panel, a bearing channel, and at least one support strut;

the bearing channel traversing the horizontal panel between the fore end and the rear end of the carriage;

the carrier rail being slidably positioned into the bearing channel;

the vertical panel being mounted to the horizontal panel adjacent to the fore end of the carriage;

the at least one support strut being connected between the horizontal panel and the vertical panel;

the locking mechanism further comprising a locking pin, an operating handle, a lock plate, a cam guide, a lock groove, a spring member, and a spring perch;

the lock plate being mounted to a vertical panel of the carriage;

the cam guide extending along the lock plate;

the lock groove being terminally conjoined to the cam guide;

the operating handle being terminally and angularly mounted to the locking pin;

the operating handle being positioned into the cam guide;

the spring perch being mounted onto the locking pin between the carriage and the operating handle, wherein the spring member biases the operating handle into the lock groove;

the spring member being connected between the spring perch and the carriage; and the locking pin extending through the carriage and being selectably engaged along the carrier rail.

16. The lockable cargo retaining apparatus as claimed in claim 15 comprising:

the at least one load-securing element comprising a retaining plate and at least one fastener;

the retaining plate being positioned adjacent to the fore end of the carriage;

the retaining plate being oriented laterally to the carrier rail; and the retaining plate being releasably mounted to the carriage with the at least one fastener.

17. The lockable cargo retaining apparatus as claimed in claim 15 comprising:

the at least one load-securing element comprising a cargo bracket, a retainer pin, a threaded rod, and a screw handle;

the cargo bracket being slidably mounted onto a vertical panel of the carriage;

the vertical panel comprising a plurality of perforations distributed along the vertical panel;

the retainer pin being selectably engaged between the cargo bracket and one of the plurality of perforations;

the threaded rod being adjustably mounted into the cargo bracket towards the carrier rail; and the screw handle being terminally mounted to the threaded rod, opposite the carrier rail along the threaded rod.

18. The lockable cargo retaining apparatus as claimed in claim 15 comprising:

the at least one load-securing element comprising a retaining wall, a first lateral panel, a second lateral panel, at least one tensile member, and at least one fixture tab;

the retaining wall being oriented laterally and removably attached to the carriage;

the first lateral panel and the second lateral panel being terminally connected to the retaining wall opposite each other along the retaining wall;

the at least one tensile member being mounted between the first lateral panel and the second lateral panel;

the at least one fixture tab being mounted to the retaining wall, opposite the at least one tensile member; and the at least one fixture tab being releasably engaged to a retaining plate.

19. The lockable cargo retaining apparatus as claimed in claim 15 comprising:

the at least one load-securing element comprising a retaining wall, a first lateral panel, a second lateral panel, and a lifting handle; and the lifting handle being mounted to the retaining wall between the first lateral panel and the second lateral panel.

* * * * *